United States Patent Office 3,287,235
Patented Nov. 22, 1966

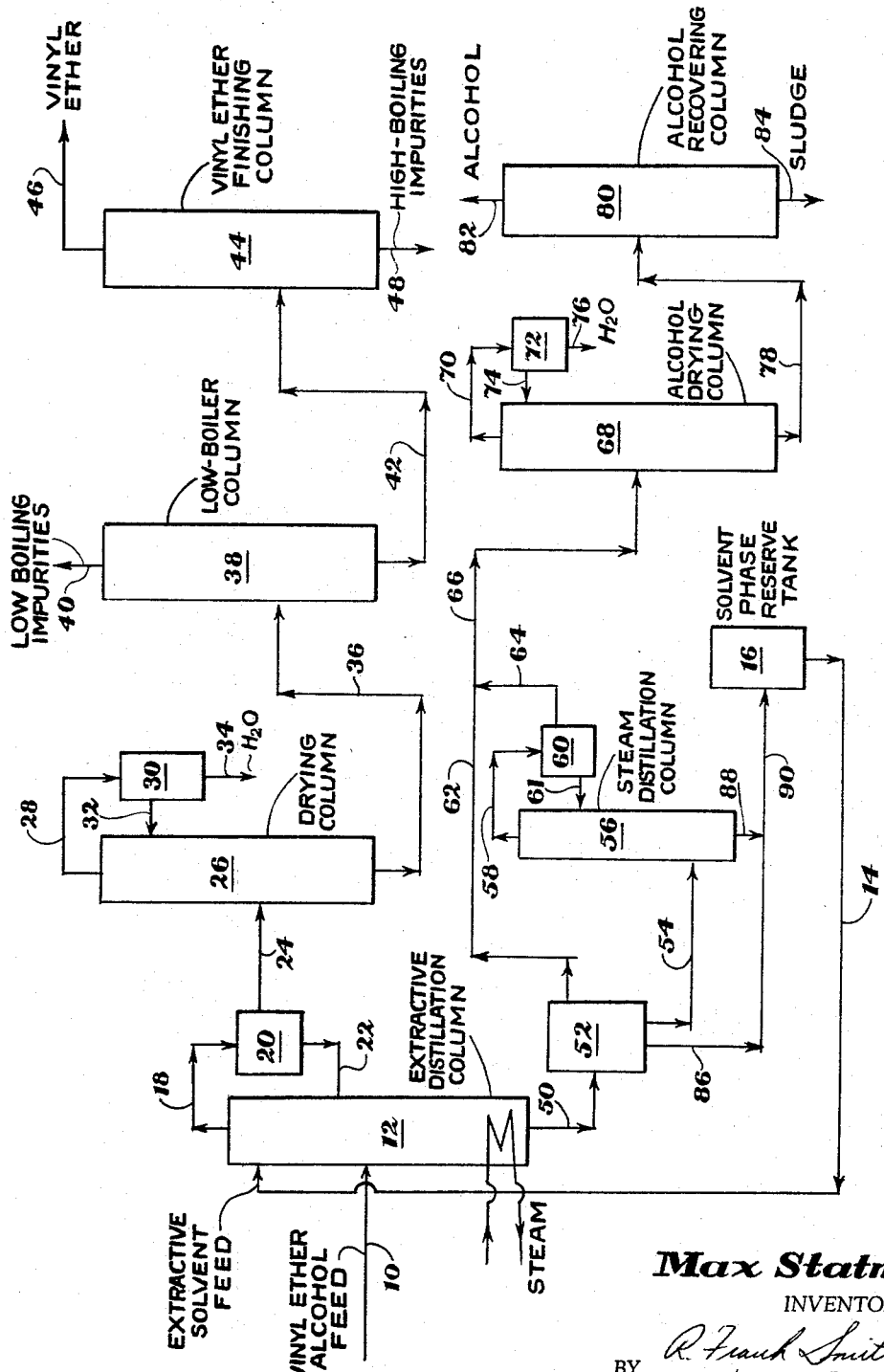

3,287,235
SEPARATION OF ALKYL VINYL ETHERS FROM ALKANOLS BY EXTRACTIVE DISTILLATION WITH WATER OR WATER AND PHENOL
Max Statman, Longview, Tex., assignor to Eastman Kodak Company, Rochester, N.Y., a corporation of New Jersey
Filed Feb. 28, 1963, Ser. No. 261,757
7 Claims. (Cl. 203—55)

This invention relates to the separation, by extractive distillation, of a vinyl ether from a difficulty separable mixture comprised of the vinyl ether and an alcohol. This invention relates also to the further treatment of the thus separated vinyl ether to provide a substantially pure product.

One method for the preparation of an alkyl vinyl ether is by the reaction of acetylene and an alcohol. The reaction is well known and a description thereof can be found in Industrial and Engineering Chemistry, vol. 40, pages 1171–1177 (1948).

The reaction can be illustrated as follows:

$$R-OH + HC \equiv CH \rightarrow R-O-CH=CH_2$$

In the above reaction R represents an alkyl radical. The conversion of the alcohol to the alkyl vinyl ether is never complete and, in the case where the alcohol has an alkyl group containing more than 3 carbon atoms, the reaction must be closely controlled in order to avoid a substantial yield of undesirable by-products. Any attempt at full alcohol conversion yields by-products such as acetals and polymers of the alkyl vinyl ether. Thus, the alkyl vinyl ether reaction product will usually contain, in admixture therewith, a substantial proportion of the reactant alcohol. The reactant alcohol must be subsequently separated from the alkyl vinyl ether.

In the manufacture of an alkyl vinyl ether from an alcohol having an alkyl group in which the number of carbon atoms therein is four or greater, the separation of the alkyl vinyl ether reaction product and the reactant alcohol by simple fractional distillation is rendered difficult owing to the fact that the boiling points of the ether and the alcohol are relatively close. The separation of fractional distillation is further compounded by the formation of alcohol-ether azeotropes.

Thus, for example, butyl alcohol has a boiling point of about 117.4° C. and butyl vinyl ether has a boiling point of about 93.4° C.; n-hexyl vinyl ether has a boiling point of about 143.5° C. and n-hexyl alcohol has a boiling point of about 157.2° C.; n-heptyl vinyl ether has a boiling point of 165° C. and n-heptyl alcohol has a boiling point of about 176° C.; n-octyl vinyl ether has a boiling point of about 186° C. and n-octyl alcohol has a boiling point of about 195° C.; n-nonyl vinyl ether has a boiling point of about 207° C. and n-nonyl alcohol has a boiling point of about 213° C.; and cyclohexyl vinyl ether has a boiling point of about 148° C. and cyclohexyl alcohol has a boiling point of about 161° C. Neohexyl alcohol has a boiling point of about 136° C. and neohexyl vinyl ether has a boiling point of about 124.5° C., and the two form an azeotrope having a boiling point of about 122.5° C.

Water washing to remove unreacted alcohol from the alcohol-ether mixture is not practical because of the relatively low water solubility of the alcohol and the ether. Thus, for example, butyl alcohol has a water solubility of about 9 grams per 100 grams of water and butyl vinyl ether has a water solubility of about 0.1 gram per 100 grams of water; amyl alcohol has a water solubility of about 3.2 grams per 100 grams of water and amyl ether has a water solubility of less than about 0.1 gram per 100 grams of water; and neohexyl alcohol has a water solubility of about 0.6 gram per 100 grams of water and neohexyl vinyl ether has a water solubility of less than about 0.1 gram per 100 grams of water.

Broadly, this invention is directed to the separation of an alkyl vinyl ether from a mixture comprised of the alkyl vinyl ether and the alcohol used in its preparation.

More specifically, this invention is directed to a process for the separation of an alkyl vinyl ether from a mixture comprised of the alkyl vinyl ether and an alcohol which includes the step of heating the mixture in an extractive distillation unit or column to about a temperature at which the mixture vaporizes while bringing the mixture into contact with an extractive solvent or liquid. The extractive distillation step is followed by purification and recovery of substantially pure alkyl vinyl ether, and purification and recovery of substantially pure alcohol. The alcohol is recycled to a reactor if desired, where it is reacted with acetylene to provide additional alcohol-ether mixture for further treatment in accordance with this invention.

For a complete understanding of this invention reference is made to the following detailed description and drawing in which the single figure is a simplified flow plan of a substantially continuous process for use in carrying out this invention.

In accordance with this invention extractive distillation is employed in the separation of an alcohol component and an alkyl vinyl either component of a mixture derived by the reaction of an alcohol and acetylene. Briefly, the separation is carried out in an extractive distillation column wherein an extractive solvent, which acts as a preferential solvent for the alcohol component of the mixture, is introduced at the top of the column and flows down the extractive distillation washing ascending vapors of alcohol and vinyl alkyl ether and absorbing the alcohol component thereof preferentially. The separation system is maintained at a temperature such that a liquid and a vapor phase co-exist. The vapor pressure of the alcohol is lowered and hence the relative volatility of the ether-alcohol mixture to be separated is raised. The rectifying action of the extractive solvent is due to its effect on the relative volatility of the alcohol component and the vinyl alkyl ether component to be separated.

The extractive solvent employed in this invention can be water or a phenol-water mixture. The phenol-water mixture is preferred, and phenol-water mixtures which consist of, by weight, from about 90 to 99 parts of water and 10 parts to 1 part of phenol can be employed satisfactorily.

This invention can be more fully understood by reference to the accompanying process flow sheet. This flow sheet illustrates one of the preferred methods adapted to carry out the process of this invention and is not intended to limit the invention in any way. A mixture comprised of alcohol and vinyl ether, as received from a reactor, is fed by means of connection 10 to extractive distillation column 12 comprised of a plurality of trays (not shown) where an extractive solvent which can be water or a water-phenol mixture is fed continuously through connection 14 from a solvent phase reserve tank to a top tray (not shown) of column 12.

The base of the extractive distillation column is heated by passing, under pressure, steam through suitable connections. An overhead fraction comprised of vinyl ether is produced at column 12 and passes by means of connection 18 to decanter 20 where water is recovered and returned to the extractive distillation column 12 by means of connection 22. A layer of organic material is separated out in decanter 20 and contains the vinyl ether together with some low-boiling impurities. This organic layer is substantially free of alcohol. If a water-phenol mixture is used as the extractive medium in carrying out this invention it has been found that the organic layer recovered in decanter 20 is also substantially free from phenol. The organic layer is then fed by means of connection 24 to drying column 26 where any water contained in the organic layer is substantially all removed therefrom by azeotropic distillation. The drying column 26 rectifies the organic layer to send an azeotropic mixture containing water overhead and out through connection 28 to a decanter 30. Water is separated from an organic layer in decanter 30 and the organic layer is returned to drying column 26 by means of connection 32 and the water is removed therefrom through connection 34. At the base of drying column 26 there is collected essentially water free vinyl ether. However, this recovered vinyl ether will contain some impurities that must be removed therefrom to provide a substantially pure product. Hence, the water free vinyl ether is fed by means of connection 36 to low-boiler column 38 where low boiling impurities are removed as an overhead fraction through connection 40. A base fraction from low-boiler column 38 is fed by means of connection 42 to vinyl ether finishing column 44 where the vinyl ether is removed as an overhead fraction by means of connection 46 and then into suitable storage containers or the like (not shown). A base fraction from finishing column 44 consists essentially of high-boiling impurities and is removed from the finishing column 44 by means of connection 48.

A base fraction from extractive distillation column 12 which is comprised of alcohol, extractive solvent, and a minor amount of organic impurities is fed by means of connection 50 to a decanter 52 where extractive solvent and alcohol are separated substantially into separate layers. Some of the extractive solvent layer is fed by means of connection 54 to steam distillation column 56 which provides for a substantial recovery of any organic material (primarily alcohol) contained therein. The organics are recovered from steam distillation column 56 as an overhead fraction and this fraction is passed by means of connection 58 to decanter 60 wherein the extractive solvent and the organics are separated and the extractive solvent layer is returned to steam distillation column 56 by means of connection 61. An organic portion or layer from decanter 60 is fed through connection 64, and an organic portion or layer from decanter 52 is fed through connection 62 and both are fed into a common connection 66 which delivers the combined organic portions (comprised mainly of alcohol) to alcohol drying column 68. In the alcohol drying column 68 water is removed by azeotropic distillation, the azeotrope being removed as an overhead fraction and being conducted by means of connection 70 to decanter 72 where there is formed a water layer and a layer of organic material. Organic layer is returned to column 68 by means of connection 74 and water is removed from decanter 72 by means of connection 76.

A base fraction from alcohol drying column 68 contians a substantial proportion of alcohol and a proportion of high-boiling impurities of the original reaction. This base fraction is removed by means of connection 78 and passes through alcohol recovery column 80 which is a fractional distillation column. The alcohol is removed by simple fractional distillation as an overhead fraction by means of connection 82 to a suitable storage or the like and the high-boiling impurities are removed as a base fraction by means of connection 84.

A portion of the water layer from decanter 52 and the base fraction of steam distillation column 56 are passed by means of connections 86 and 88, respectively, into a common connection 90 and then into solvent phase storage tank 16. Fresh extractive solvent is added to storage tank 16 at regular intervals as required to maintain the required amount of extractive solvent in storage tank to provide for substantially continuous operation of the system.

Any part or all of the separation and purification system above described can be operated at atmospheric pressure or under vacuum. The extractive distillation column can be operated at any convenient reflux ratio and the reflux ratio will vary depending primarily on the components of the mixture introduced therein for separation. Proper reflux ratio for various mixtures can be easily and readily determined by those skilled in the art. Usually, reflux ratio varying from about 2:1 to 10:1 can be employed satisfactorily. The ratio of the extractive solvent to column boil-up can be varied from about 0.5:1 to 10:1, with the preferred ratio being within the relatively narrow range of 1:1 to 3:1.

The following examples are illustrative of this invention. In the examples that follow all percentages are by weight unless otherwise indicated.

*Example I*

A mixture containing 85% neohexyl vinyl ether, 14% unreacted neohexyl alcohol, and 1% impurities is separated in the manner described above with reference to the single figure of the drawing. The mixture is fed into extractive distillation column 12 at a rate of 4600 pounds per day. Heat is supplied at the base of column 12 to maintain a boil-up rate in the column of about 40,000 pounds per day while the extractive solvent, which consists, by weight, of about 94% water and about 6% phenol, is fed at a rate of about 40,000 pounds per day into the extractive distillation column at the top tray thereof. An overhead fraction is fed to decanter 20 by means of connection 18. An organic layer is formed in this decanter and is removed from the decanter at a rate of about 3900 pounds per day. This organic layer is fed into the ether drying column 26 where 100 pounds per day of water is removed. Neohexyl vinyl ether is removed at the base of column 26 and is stripped of its low-boiling impurities in the low-boiler distillation column 38. The neohexyl vinyl ether from the base of column 38 is fed to column 44 where it is separated from high-boiling impurities. The overhead stream taken off from finishing column 44 is recovered at a rate of about 3900 pounds per day, all of which is substantially pure neohexyl vinyl ether.

From the base of extractive distillation column 12, about 40,700 pounds per day of extractive solvent and neohexyl alcohol are removed to decanter 52 where a neohexyl alcohol layer and an extractive solvent layer are formed. Neohexyl alcohol (containing high-boiling impurities) in an amount of about 680 pounds per day is taken from decanter 52 and fed to drying column 68. About 4000 pounds per day of the extractive solvent layer is fed to steam distillation column 56 where about 10 pounds per day of organic material is recovered which is also fed to the drying column 68. Extractive solvent recovered from the base of steam distallation column 56 and from decanter 52 is taken to solvent phase storage tank 16 for recirculation to extractive distillation column 12. Substantially dry neohexyl alcohol containing high-boiling impurities is recovered from the base of alcohol drying column 68. This base fraction is fed to alcohol recovery column 80 where 645 pounds per day of neohexyl alcohol is taken overhead and 45 pounds per day of sludge or high-boiling impurities is removed from the base of column 80. The purity of the neohexyl vinyl ether is in excess of 99.5% while the purity of the recovered neohexyl alchol is in excess of 98%.

*Example II*

A mixture containing about 12.4% neohexyl alcohol and about 87.6% neohexyl vinyl ether is fed to the center of a 30 plate laboratory distillation column at a rate of about 1 milliliter per minute. Water is fed into the top of the laboratory distillation column at a rate of about 30 ml./min. The boil-up rate of the mixture is maintained at about 10 ml./min. and about 0.876 milliliter per minute of overhead fraction is removed. This provides a reflux ratio of about 9:1 and a solvent boil-up ratio of 3:1. The overhead fraction consists essentially of neohexyl vinyl ether and water which come off at about 98° C. and which contain less than 0.5% neohexyl alcohol. The base draw-off from this column contains less than 1% neohexyl vinyl ether.

*Example III*

A mixture containing about 52% n-octyl vinyl ether and 48% n-octyl alcohol is fed to the center of a 30-plate laboratory distillation column at a rate of about 2 ml./min. A solvent phase liquid consisting of, by weight, about 5.5% phenol and about 94.5% water is fed into the top of the column at a rate of about 25 ml./min. The boil-up rate of the mixture is maintained at about 12 ml./minute and about 1.04 ml./minute overhead fraction is removed. This provides a reflux ratio of about 12:1 and a solvent to boil-up ratio of about 2:1. The overhead fraction consists essentially of n-octyl vinyl ether and water coming off at about 99° C. and containing less than about 0.4% of n-octyl alcohol. The base fraction which is drawn off from this column contains less than about 1% n-octyl vinyl ether.

*Example IV*

Using the system described in Examples II and III, a mixture containing 75% cyclohexyl vinyl ether and 25% cyclohexyl alcohol is separated at a 6:1 reflux ratio and at a 1.5:1 solvent to boil-up ratio. The extractive solvent used is a phenol-water mixture containing about 3.8% phenol and 96.2% water. The cyclohexyl vinyl ether overhead fraction contains very little alcohol and the base fraction contains less than about 1% of the ether.

*Example V*

A mixture comprised of n-butyl vinyl ether and n-butanol is derived by reacting n-butanol and acetylene. The mixture is separated in a manner similar to that described in Example I with highly satisfactory results. The recovered n-butanol and the recovered n-butyl vinyl ether are substantially pure products.

*Example VI*

A mixture comprised of amyl alcohol and amyl vinyl ether is derived by reacting amyl alcohol and acetylene. The alcohol-ether mixture is separated by substantially the same procedure employed in Example I to provide a substantially pure alcohol product and a susbtantially pure ether product.

*Example VII*

Acetylene and n-hexanol are reacted to provide a mixture comprised of n-hexanol and n-hexyl vinyl ether. The alcohol-ether mixture is subsequently separated and purified in accordance with the method of Example I with satisfactory results. The n-hexanol recovered is substantially pure as is the recovered n-hexyl vinyl ether.

*Example VIII*

A mixture comprised of n-heptyl alcohol and n-heptyl vinyl ether is derived by reacting in a reactor, n-heptyl alcohol and acetylene. The mixture is subsequently separated and purified in a manner similar to that described in Example I to provide substantially pure alcohol and pure ether product.

*Example IX*

A mixture of n-nonyl alcohol and n-nonyl vinyl ether is separated and further purified as in Example I. Highly purified n-nonyl vinyl ether and n-nonyl alcohol are obtained.

Other alcohol-alkyl vinyl ether mixtures can be purified in accordance with this invention. While this invention is adapted particularly for the purification of alcohol-alkyl vinyl ether mixtures derived by the reaction of acetylene and an alcohol having 4 and more carbon atoms in the alkyl radical, it is to be understood that equally satisfactory results can be obtained in the separation of those alcohol-alkyl vinyl ether mixtures derived from the reaction of acetylene and alcohols such as methanol, ethanol, propanol, and isopropanol. The number of carbon atoms present in the alkyl radical of the alcohol employed in reaction with acetylene can be from 1 to 20 or more.

The process disclosed and described in this specification can be employed as a batch process or as a continuous process. The proper adjustment and control of all conditions in the process depends primarily on the alcohol-ether mixture to be separated and are well within the skill of those versed in the art having before them this specification.

It is to be understood that the above description of this invention, the examples, and the drawing are illustrative of this invention and not in limitation thereof.

I claim:

1. A process for separating alkyl vinyl ether from a mixture including such alkyl vinyl ether and an alkanol which process comprises subjecting said mixture to extractive distillation in the presence of an extractive solvent selected from the group consisting of water and a water-phenol mixture and recovering a substantial portion of said alkanol in said extractive solvent.

2. A process for separating alkyl vinyl ether from a mixture including an alkanol which process comprises subjecting said mixture to extractive distillation in the presence of an extractive solvent mixture comprised of, by weight, from about 90 parts to 99 parts of water and from about 10 parts to 1 part of phenol and recovering a substantial portion of said alkanol in said extractive solvent.

3. A process for separating alkyl vinyl ether from a mixture comprising alkyl vinyl ether and a close boiling alkanol, said process comprising feeding said ether-alkanol mixture into an extractive distillation column about midway in the effective fractionation zone of the column, feeding an extractive solvent selected from the group consisting of water and a water-phenol mixture in the upper portion of the column at a point above the feed point of said ether alkanol mixture, obtaining an overhead fraction rich in alkyl vinyl ether, and obtaining a base fraction comprising a substantial proportion of said extractive solvent containing a substantial portion of said alkanol.

4. A process for separating alkyl ether from a mixture including alkyl vinyl ether and a close boiling alkanol, the steps of such process comprising feeding said ether-alkanol mixture into an extractive distillation column about midway in the effective fractionation zone of the column, feeding an extractive solvent comprised of, by weight, from about 90 parts to 99 parts of water and from about 10 parts to 1 part of phenol in the upper portion of the column at a point above the feed point of feed ether-alkanol mixture, obtaining an overhead fraction comprised of a substantial proportion of alkyl vinyl ether, and obtaining a base fraction comprised of a substantial proportion of said extractive solvent containing a substantial portion of said alkanol.

5. A process for separating alkyl vinyl ether from a mixture including alkyl vinyl ether and a close boiling alkanol, the steps of said process comprising feeding said ether-alkanol mixture into an extractive distillation column about midway in the effective fractionation zone of the column, feeding an extractive solvent comprising water in the upper portion of the column at a point above the feed point of feed ether-alkanol mixture, obtaining a fraction comprised of a substantial proportion of alkyl vinyl ether, and obtaining another fraction comprised of a substantial proportion of said extractive solvent containing a substantial portion of said alkanol.

6. A process for separating alkyl vinyl ether from a mixture including alkyl vinyl ether and an aliphatic alcohol where the alkyl groups of the vinyl ether and the alcohol have 4 to 12 carbon atoms, said process comprising feeding the ether-alcohol mixture to an extractive distillation column about midway in the effective fractionation zone of the column, feeding an extractive solvent selected from the group consisting of water and a water-phenol mixture in the upper portion of the column at a point above feed point of said ether-alcohol mixture, obtaining a fraction comprised of a substantial proportion of alkyl vinyl ether, and obtaining another fraction comprised of a substantial proportion of extractive solvent containing a substantial portion of said alcohol.

7. A process for separating alkyl vinyl ether from a mixture comprising alkyl vinyl ether and aliphatic alcohol where the alkyl groups of the alkyl vinyl ether and the alcohol have 4 to 12 carbon atoms, said process comprising feeding said ether-alcohol mixture into an extractive distillation column about midway in the effective fractionation zone of the column, feeding an extractive solvent comprised of, by weight, from about 90 parts to 99 parts of water and from about 10 parts to 1 part of phenol in the upper portion of the column at a point above the feed point of said ether-alcohol mixture, obtaining an overhead fraction comprised of a substantial proportion of alkyl vinyl ether, and obtaining a base fraction comprised of a substantial proportion of extractive solvent containing a substantial portion of said alcohol.

References Cited by the Examiner

UNITED STATES PATENTS

| | | | |
|---|---|---|---|
| 2,080,111 | 5/1937 | Bump | 202—39.5 |
| 2,520,006 | 8/1950 | Hibshman et al. | 202—39.5 |
| 2,551,593 | 5/1951 | Gilliland et al. | 203—96 |
| 2,583,412 | 1/1952 | Carlson et al. | 202—39.5 |
| 2,681,306 | 6/1954 | Kemp et al. | 202—96 |
| 2,721,222 | 10/1955 | Cottle et al. | 260—616 |
| 2,724,731 | 11/1955 | Findlay | 202—39.5 |
| 2,779,720 | 1/1957 | Tanona | 202—39.5 |
| 2,801,209 | 7/1957 | Muller et al. | 202—39.5 |
| 2,836,546 | 5/1958 | Faerber | 260—616 |
| 2,856,436 | 10/1958 | Faerber | 260—616 |
| 3,214,347 | 10/1965 | Grekel et al. | 203—96 |

NORMAN YUDKOFF, *Primary Examiner.*

W. L. BASCOMB, *Examiner.*